UNITED STATES PATENT OFFICE.

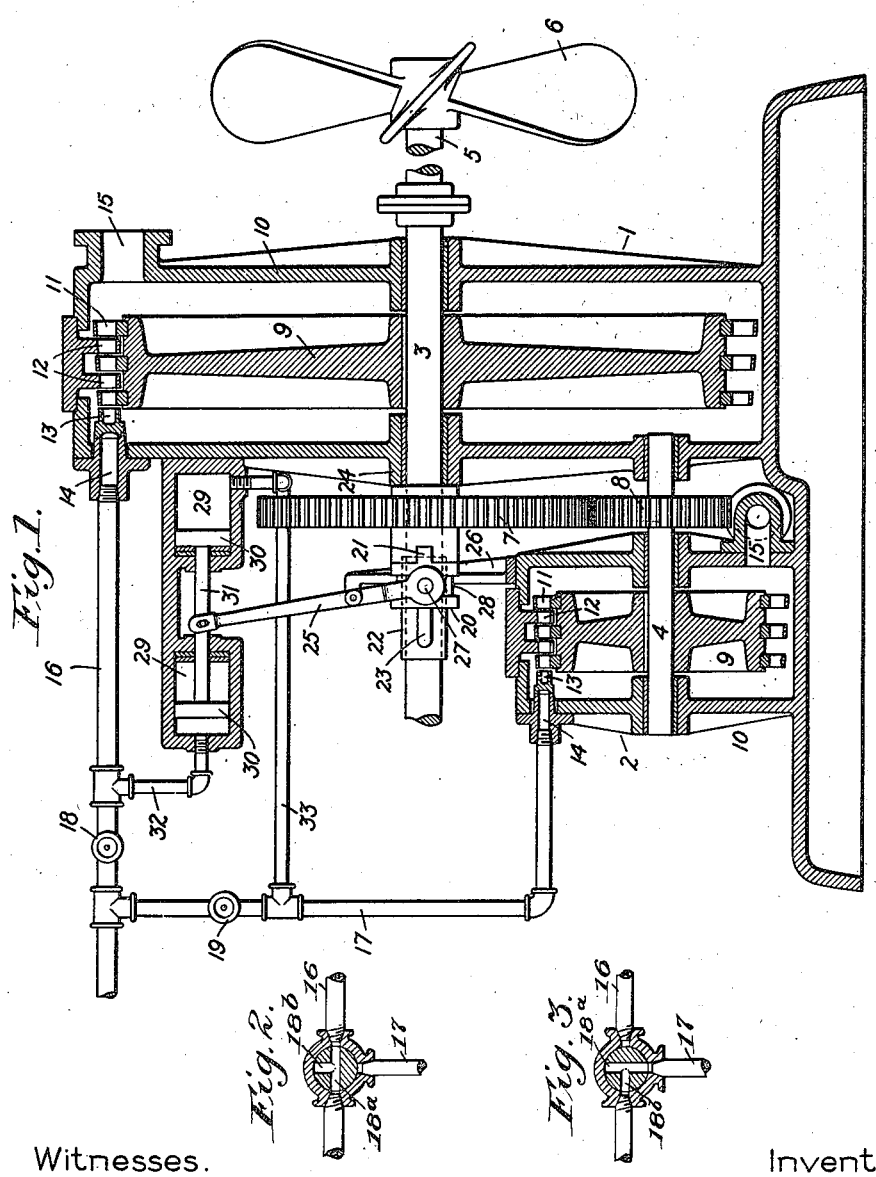

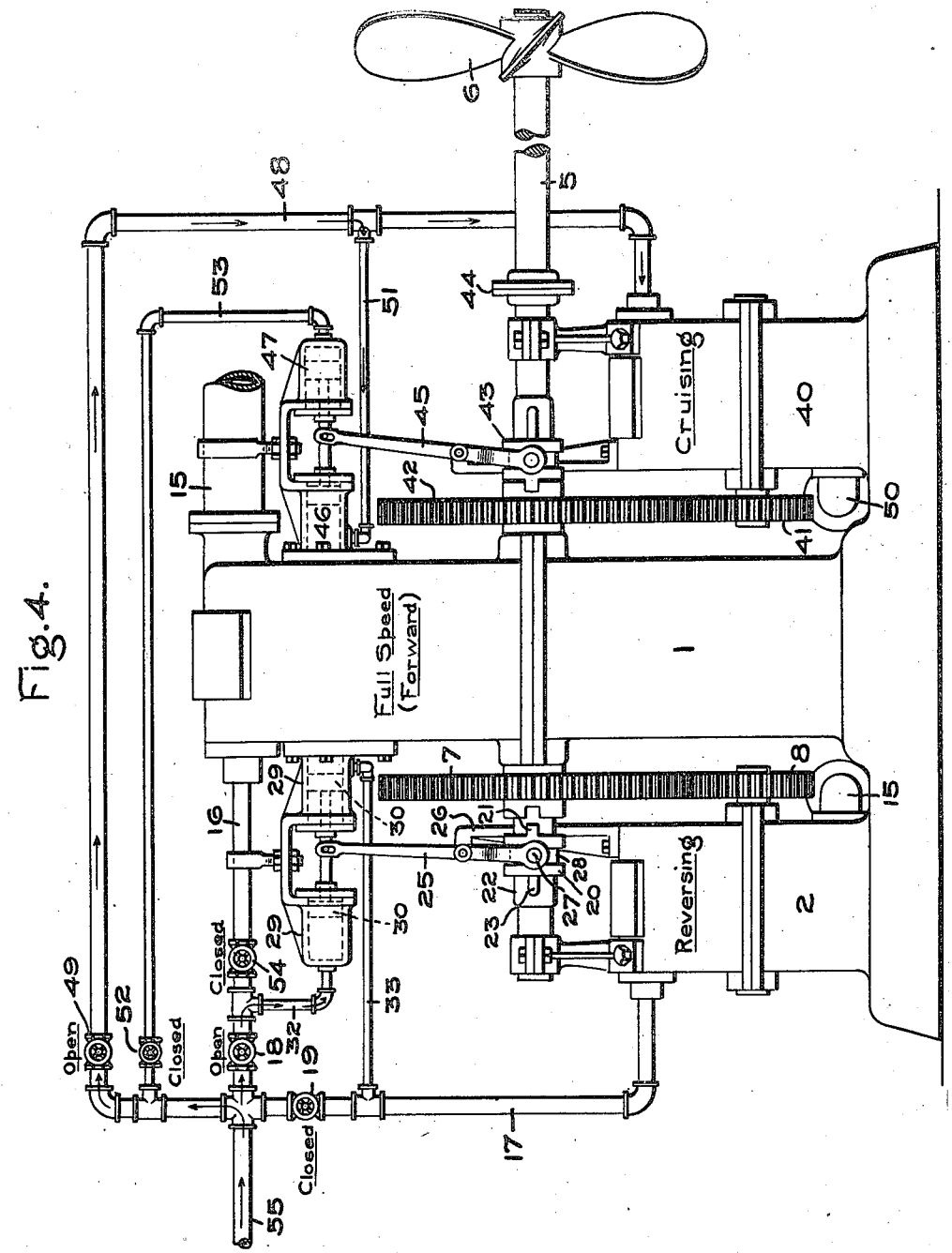

HENRY GEISENHÖNER, OF SCHENECTADY, NEW YORK, ASSIGNOR TO GENERAL ELECTRIC COMPANY, A CORPORATION OF NEW YORK.

ELASTIC-FLUID TURBINE.

945,933.  Specification of Letters Patent.  Patented Jan. 11, 1910.

Application filed February 10, 1905. Serial No. 244,997.

*To all whom it may concern:*

Be it known that I, HENRY GEISENHÖNER, a citizen of the United States, residing at Schenectady, in the county of Schenectady and State of New York, have invented certain new and useful Improvements in Elastic-Fluid Turbines, of which the following is a specification.

The present invention relates to a system of prime movers such as elastic-fluid turbines, which are arranged in a manner to enable power to be delivered to a single driving shaft from any one of the units.

It contemplates the use of a main turbine for furnishing power for normal operation, and one or more secondary turbines for other conditions of operation, which may be coupled to the driving shaft at any time when the same is required for service.

A system of this character may be employed for various purposes. For the sake of simplicity I have illustrated the same as a set of prime movers for propelling a vessel. In this class of service provision is necessary for reverse as well as for forward running. To meet this requirement I provide a main turbine, which is preferably permanently connected with the propeller shaft and used for forward movement of the vessel, and a secondary turbine for astern movement. Between the secondary turbine and driving shaft a suitable power or transmitting connection is provided whereby the said turbine may be cut into or out of service when desired, thus relieving the main turbine of the extra load of driving the secondary turbine while rotating the propeller-shaft.

The power-transmitting connection between the secondary turbine and the driving shaft is also a feature of the invention. I have aimed to provide a means which operates automatically to connect the secondary turbine to the driving shaft when motive fluid is supplied to the said turbine, and to disconnect it when motive fluid is supplied to the main turbine, thereby insuring the proper driving relation between the turbines and the shaft.

The secondary turbine, instead of being used for reversing purposes, may be employed as a low-speed turbine for forward propulsion of the vessel for cruising speed. Again, two secondary turbines may be employed, one as a reverser and the other as a cruising turbine with separate automatically-actuated gearing connections between their respective shafts and the driving or propelling shaft.

For a more detailed understanding of the invention reference is to be made to the following description, taken in connection with the accompanying drawing which illustrates one embodiment of my invention.

The novel features will be set forth in the claims appended hereto.

In the drawings Figure 1 is a view of my improved power apparatus showing the turbines in longitudinal sections; Figs. 2 and 3 are sectional views of a valve for controlling the apparatus, and Fig. 4 shows an arrangement of full speed, cruising and reversing turbines.

Referring to the drawing, 1 and 2 represent, respectively, a main turbine and a secondary turbine shown in central longitudinal section. These may be of any suitable construction, although turbines of the well-known Curtis type are shown for convenience of illustration. The turbine shafts 3 and 4 may be arranged in any relation to each other, preferably parallel and non-alining. Permanently or otherwise connected with the shaft 3 of the main turbine is a propeller-shaft 5 which is provided with a reversing propeller 6. No attempt is made to show bearings or brackets for the propeller shaft or the coupling between the latter and the main turbine shaft, as these are immaterial features so far as the present invention is concerned. Between the turbine shafts are permanently meshing gears 7 and 8 by means of which the secondary turbine may deliver power to the propeller-shaft through the agency of the main turbine shaft.

Two turbines are similarly constructed but are of different dimensions. Each comprises a bucket-wheel 9 keyed to its shaft and mounted in a casing 10. The bucket-wheel is provided with a number of rows of buckets 11 with which coöperate intermediates 12, the buckets receiving steam or other elastic fluid through discharging devices 13 from a steam chest 14. The exhaust steam from the buckets escapes through a port 15 which may connect with a condenser or to atmosphere. The turbines are mounted on a common base and their casings are made in two parts divisible on a horizontal plane.

The supplies of motive fluid are delivered through conduits 16 and 17 connected respectively to the main and secondary turbines, which conduits are controlled by separate valves 18 and 19.

In order that the secondary turbine may be thrown into or out of operation, that is to say, connected with or disconnected from the driving shaft, a clutch mechanism is provided which controls the gearing between the turbine shafts. This mechanism is preferably arranged on the main turbine shaft 3, and comprises a slidable member 20 which is provided with teeth 21 that engage in slots formed in the hub of the gear 7, although any other clutching arrangement may be employed. The slidable member 20 moves on a sleeve 22 fixed on the shaft 3 and is caused to turn with the shaft by means of a feather 23. The gear 7 is prevented from moving axially of the shaft by being confined between one end of the sleeve 22 and a bearing boss 24 formed on the turbine casing, so that the gears are maintained permanently in mesh. To operate the movable member of the clutch a lever 25 is provided which is fulcrumed upon a bracket 26 mounted on the secondary turbine casing or any other suitable part. The connection between the lever and the movable sleeve is of the usual slip arrangement; that is to say, the lever has a bifurcated end carrying inwardly-projecting pins 27 which engage in an annular groove 28 provided in the circumference of the movable member.

The lever 25 may be manually actuated if desired, although I prefer to operate it automatically. For this purpose a motor is employed which utilizes the pressure of the fluid supplied to the turbine. It comprises cylinders 29, each having a single acting piston 30, which pistons are rigidly connected by a rod 31. To the rod 31 is pivoted the free end of the clutch actuating lever 25. The pistons are connected to the supply conduits leading to the turbines in such a manner that when the supply to the main turbine is opened, pressure is brought to bear upon the motor to release the clutch and when the supply to the auxiliary turbine is opened to set the clutch. To bring about this result the main supply conduit 16 is connected with the left-hand cylinder on the motor by a connection 32, and the secondary conduit 17 is connected with the right-hand cylinder by supply pipe 33, both supply pipes 32 and 33 being connected with their respective supply conduits at a point on the turbine side of the valves 18 and 19. By this arrangement a single valve serves to control the supply to each turbine and the motor, thereby permitting the turbine to be started into operation and the proper gearing relation between the turbine and driving shaft effected in one operation. A single, suitably-constructed three-way valve may be substituted for the separate valves located at the juncture of the supply pipes. This valve is represented in Figs. 2 and 3. In the position shown in Fig. 2 the port 18$^a$ connects the source of steam supply through the pipes 16 and 32 with the main turbine and the left hand cylinder of the clutch actuating motor. In the position shown in Fig. 3, the ports 18$^a$ and 18$^b$ connect the source through the pipes 17 and 33 with the auxiliary turbine and the right hand cylinder of the clutch actuating motor. Obviously, by turning the valve from one position to the other, the supply to one turbine is first cut off and then opened to the other turbine. The proper location of the motor may be determined by circumstances, the arrangement shown being more or less diagrammatical.

The secondary turbine according to the predetermined direction of rotation may be a reversing or a cruising turbine. Furthermore, the arrangement of the secondary turbine may be duplicated, thus providing a power set comprising three turbines, namely, a high speed main turbine, a cruising secondary turbine and a reversing secondary turbine, each secondary turbine having separate gearing and clutch mechanisms.

In Fig. 4 is shown an arrangement of turbines for propelling a ship at full speed forward, cruising speed and reversing. 1 indicates the main turbine for driving the vessel at full speed forward and is direct connected to the propeller shaft 5. The reversing turbine is indicated at 2 and is adapted to drive the propeller shaft through suitable means which may be typified by the pinion 8 spur gear 7 and clutch parts 20, 21 and hub of the gear 7. The clutch is actuated by the lever 25 and pistons 30 located in cylinders 29 as described in connection with Fig. 1. The cruising turbine 40 is suitably mounted with respect to the main turbine, as for example on its base or other suitable frame. This turbine is connected to the propeller shaft by suitable means which may be typified by the pinion 41, spur gear 42 and clutch 43. The clutch may advantageously be of the character employed for connecting and disconnecting the reversing turbine and the propeller shaft. The connecting means between the cruising turbine and the propeller shaft 5 may be on one side or the other of the main shaft coupling 44 as is desired. The clutch is operated by the lever 45 and motors 46 and 47 after the fashion of the clutch for the reversing turbine. Steam is supplied to the cruising turbine by the conduit 48 under the control of valve 49 and is exhausted by the conduit 50. The action of motor 46 for operating the clutch in one direction is controlled by the valve 49 which admits steam to and cuts it off from the pipe 51. The action of the motor 47 which moves the clutch 43 in the opposite direction is controlled by the valve 52 which admits steam to and cuts it off from the pipe 53.

The action of the apparatus is as follows: Assuming that the main turbine has been operating and it is desired to reduce the speed to cruising conditions, the valve 54 is closed which shuts off steam to turbine 1. The valve 49 is then opened and steam passes from the main 55 to the motor 46 which closes the clutch 43, and to the cruising turbine 40. Under these conditions the propeller 6 is driven by the turbine 40, the turbines 1 and 2 being idle. As the exhaust conduits are not disturbed the bucket wheels of turbines 1 and 2 will rotate in a vacuum and consume little power. The turbine 40 can rotate at a suitable speed to produce economical results, and by reason of the speed reducing connection the propeller shaft will rotate at the desired reduced speed. To reverse the ship valve 49 is closed and then valve 18. Valve 52 is then opened and later valve 19. This results in unclutching the cruising turbine and clutching in the reversing turbine. The change from the reversing to the main turbine drive has been described in connection with Fig. 1 and need not be repeated.

As the bucket-wheel or wheels of the main turbine rotate with the propeller-shaft it is obvious that when the secondary turbine is operating the main bucket-wheel is rotated at the same time. In order to reduce the consumption of energy by such rotation of the main bucket wheel a vacuum may with advantage be maintained in the main turbine casing, thus relieving the secondary turbine to a certain extent.

From the above description it will be noted that in my system the turbines are entirely independent in operation and deliver substantially their full power to a common driving shaft.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,

1. In an apparatus of the character described, the combination of a plurality of turbines having separate shafts, a driven shaft which receives power from the turbines, a power-transmitting connection between the turbine shafts, and a power actuated clutch means for connecting and disconnecting one of the turbines and the driver shaft.

2. In an apparatus of the character described, the combination of a main turbine, a secondary turbine, independent fluid discharging devices for the turbines, a driven shaft directly connected with the main turbine shaft, gearing for transmitting power from the secondary turbine to the driven shaft, and means for cutting the secondary turbine into and out of service.

3. In an apparatus of the character described, the combination of a main turbine, a secondary turbine, a controllable gearing connection between the turbine shafts, and a driven shaft which is adapted to receive power from either turbine.

4. In an apparatus of the character described, the combination of a main turbine, a secondary turbine, a driven shaft directly connected to the shaft of the main turbine, a gearing between the shafts of the turbines, and a clutch mechanism for controlling the operative relation of the secondary turbine to the driven shaft through said gearing.

5. In combination, independent turbines, a driving connection between the shafts thereof, and means for controlling said connection which depends for its operation upon the supplies of motive fluid to the turbines.

6. In combination, independent turbines, a driving connection between the shafts thereof, means for controlling said connection, and an automatically-actuated motor for operating said means which depends for its operation upon the supplies of motive fluid to the turbines.

7. In combination, independent turbines, gearing between the shafts thereof, a clutch controlling said gearing, a motor for actuating the clutch, and a system of supply conduits whereby the motor and either turbine may be operated simultaneously.

8. In combination, independent turbines, gearing between the shafts thereof, a clutch controlling the gearing, a motor for actuating the clutch, a main supply conduit leading to the main turbine, a secondary supply conduit leading to the secondary turbine, connections between the said conduits and motor, and valves controlling the supply of the motive fluid to the turbine and motor whereby the clutch is disconnected when the main supply is opened and connected when the secondary supply is opened.

9. In a set of engines for marine propulsion, a propeller shaft, an engine to drive said shaft in a manner to propel the vessel forward, an independent means comprising an elastic fluid turbine adapted to drive said shaft to reverse the vessel, power actuated means to disconnect said turbine from said shaft while the vessel is being driven forward, and valve mechanism for controlling the action of the last mentioned means.

10. The combination of a propeller shaft, a forward driving turbine connected thereto, a second shaft, a separate and independent reversing turbine connected thereto, power-actuated clutch means to connect and disconnect said shafts, and valve mechanism for controlling the action of the last mentioned means.

11. The combination of two reversely acting turbines, a controller means adapted to cut one of said turbines out of service before admitting motor fluid to the other, separate shafts for said turbines, a propeller driven by one of said shafts, power actuated means for connecting and disconnecting said shafts which is so coupled up with said controller means that when one of said turbines is disconnected by said means from the propeller shaft its supply of motor fluid is cut off, and power transmission means between the shaft which permits one to move at a different rate of speed than the other.

12. In a marine turbine, a propeller shaft, a forward driving and a reversing turbine adapted to drive said shaft, a clutch, a piston and cylinder for actuating the clutch, and means adapted to simultaneously operate the clutch to disconnect one of said turbines from said shaft and cut off its supply of motive fluid.

13. The combination of a propeller shaft, a forward driving turbine fixedly connected thereto, a second shaft, a reversing turbine connected thereto, a speed reducing gearing between the second shaft and the propeller shaft, and clutch means acting on the gearing to connect and disconnect said shafts.

14. In combination, a shaft, an engine for driving said shaft, a turbine for driving said shaft, a speed changing driving connection between the turbine and said shaft, and a means for rendering said connection operative or inoperative.

15. In combination, a shaft, an engine for driving it under full speed conditions, a turbine for driving a shaft under cruising speed conditions, a speed changing connection for conveying the power of the turbine to said shaft, and a means for cutting off the supply of motive fluid to the engine when the turbine is operating.

16. In combination, a propeller shaft, an engine for driving it under speed conditions, a turbine for driving the propeller shaft under cruising speed conditions, the propeller and turbine shafts being parallel and non-alining, means for conveying power from the turbine shaft to the propeller shaft, and means for cutting the engine and turbine into and out of operation.

17. In combination, a propeller shaft, an engine for driving it, a cruising turbine, a reversing turbine, means for conveying power from the turbine to the propeller shaft, and means for connecting the turbine shafts to and disconnecting them from the propeller shaft.

In witness whereof, I have hereunto set my hand this 8th day of February, 1905.

HENRY GEISENHÖNER.

Witnesses:
BENJAMIN B. HULL,
HELEN ORFORD.